United States Patent
Heitz et al.

(10) Patent No.: US 9,676,149 B2
(45) Date of Patent: Jun. 13, 2017

(54) STEERING COLUMNS FOR A MOTOR VEHICLE AND METHODS FOR MANUFACTURING SAME

(71) Applicant: THYSSENKRUPP PRESTA AG, Eschen (LI)

(72) Inventors: Thomas Heitz, Mauren (LI); Sebastian Regner, Lindau (DE); Arne Schacht, Feldkirch (AT)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/898,632

(22) PCT Filed: Mar. 17, 2014

(86) PCT No.: PCT/EP2014/055291
§ 371 (c)(1),
(2) Date: Dec. 15, 2015

(87) PCT Pub. No.: WO2014/202247
PCT Pub. Date: Dec. 24, 2014

(65) Prior Publication Data
US 2016/0137218 A1    May 19, 2016

(30) Foreign Application Priority Data

Jun. 20, 2013    (AT) .................................. A 504/2013
Aug. 26, 2013    (DE) ........................ 10 2013 014 032

(51) Int. Cl.
*B29C 70/38*        (2006.01)
*B29C 53/56*        (2006.01)
(Continued)

(52) U.S. Cl.
CPC .......... *B29C 70/382* (2013.01); *B29C 33/485* (2013.01); *B29C 53/564* (2013.01);
(Continued)

(58) Field of Classification Search
CPC ...................................................... B62D 1/16
See application file for complete search history.

(56) References Cited

U.S. PATENT DOCUMENTS 4,562,975 A * 1/1986 Wackerle .............. B29C 53/602
156/172
4,589,679 A * 5/1986 Wackerle ............... B62D 1/192
280/777
(Continued)

FOREIGN PATENT DOCUMENTS

DE    10 2004 007 313 A1    9/2005
DE    10 2005 034 952 B3    2/2007
(Continued)

OTHER PUBLICATIONS

German Language International Search Report for International patent application No. PCT/EP2014/055291; mailing date Jul. 4, 2014.
(Continued)

*Primary Examiner* — Drew J Brown
(74) *Attorney, Agent, or Firm* — thyssenkrupp North America, Inc.

(57) ABSTRACT

A steering-column assembly for a motor vehicle may include a steering spindle rotatably mounted in a steering-column tube, which steering-column tube is mounted in a console that connects the steering-column directly or indirectly to a body of the motor vehicle. At least one of the components of the steering-column, such as the console, for example, may include a fiber composite component that can be formed by winding fibers along tracks of a winding spool of a winding core, introducing a curable resin into the fibers or a mold to be used with the wound fibers, curing the wound fibers, and removing the winding spool and the winding core so as to release the fiber composite component. The fiber
(Continued)

composite component may then be fitted into the steering column assembly.

12 Claims, 6 Drawing Sheets

(51) Int. Cl.
| | | |
|---|---|---|
| B62D 1/16 | (2006.01) | |
| B29C 70/68 | (2006.01) | |
| B29C 33/48 | (2006.01) | |
| B29C 70/30 | (2006.01) | |
| B29C 70/34 | (2006.01) | |
| B29C 70/16 | (2006.01) | |
| B29C 70/32 | (2006.01) | |
| B29C 70/48 | (2006.01) | |
| B29C 70/86 | (2006.01) | |
| B29C 53/80 | (2006.01) | |
| B29K 105/08 | (2006.01) | |
| B29L 31/30 | (2006.01) | |
| B29K 105/00 | (2006.01) | |
| B29K 105/10 | (2006.01) | |

(52) U.S. Cl.
CPC ............ B29C 70/16 (2013.01); B29C 70/30 (2013.01); B29C 70/32 (2013.01); B29C 70/345 (2013.01); B29C 70/38 (2013.01); B29C 70/48 (2013.01); B29C 70/68 (2013.01); B29C 70/86 (2013.01); B62D 1/16 (2013.01); B29C 53/8066 (2013.01); B29K 2105/0058 (2013.01); B29K 2105/089 (2013.01); B29K 2105/10 (2013.01); B29K 2105/25 (2013.01); B29L 2031/30 (2013.01); B29L 2031/3055 (2013.01)

(56) References Cited

U.S. PATENT DOCUMENTS

| | | | |
|---|---|---|---|
| 4,798,101 A * | 1/1989 | Yamazawa | B62D 1/04 74/552 |
| 5,435,869 A | 7/1995 | Christensen | |
| 9,327,757 B2 * | 5/2016 | Kehrl | B62D 1/192 |
| 9,365,233 B2 * | 6/2016 | Heitz | B62D 1/16 |
| 2001/0051544 A1 * | 12/2001 | Kimoto | F16C 3/026 464/181 |
| 2003/0010424 A1 | 1/2003 | Lindenau | |
| 2006/0207415 A1 | 9/2006 | Bechtold et al. | |
| 2008/0290641 A1 | 11/2008 | Galehr et al. | |
| 2014/0302939 A1 * | 10/2014 | Kehrl | F16F 7/12 464/181 |
| 2015/0047456 A1 | 2/2015 | Heitz et al. | |
| 2015/0367876 A1 * | 12/2015 | Heitz | B29C 70/52 74/492 |

FOREIGN PATENT DOCUMENTS

| | | |
|---|---|---|
| DE | 10 2011 055 357 A1 | 9/2012 |
| DE | 10 2011 114 675 A1 | 4/2013 |
| DE | 10 2012 005 434 B3 | 4/2013 |
| EP | 0 091 671 A2 | 10/1983 |
| EP | 1 268 164 B1 | 8/2003 |
| FR | 2 971 476 A1 | 8/2012 |
| GB | 2 379 637 A | 3/2003 |
| JP | H05269868 A | 10/1993 |
| WO | 2004/057082 A1 | 7/2004 |

OTHER PUBLICATIONS

English translation of International Search Report for International patent application No. PCT/EP2014/055291; mailing date Jul. 4, 2014.
English translation of the abstract of FR 2 971 476 A1.
English translation of the abstract of DE 10 2011 055 357 A1.
English translation of the abstract of EP 0 091 671 A2.
English translation of the abstract of DE 10 2011 114 675 A1.
English translation of the abstract of DE 10 2004 007 313 A1.
English translation of the abstract of JP H05269868 A.

* cited by examiner

STEERING COLUMNS FOR A MOTOR VEHICLE AND METHODS FOR MANUFACTURING SAME

CROSS REFERENCE TO RELATED APPLICATIONS

This application is a U.S. National Stage Entry of International Patent Application Serial Number PCT/EP2014/055291, filed Mar. 17, 2014, which claims priority to German Patent Application No. DE 102013014032.3 filed Aug. 26, 2013 as well as Austrian Patent Application No. A504-2013 filed Jun. 20, 2013, the entire contents all of which are incorporated herein by reference.

FIELD

The present disclosure relates to steering columns for motor vehicles and methods of manufacturing such steering columns.

BACKGROUND

The steering column of a motor vehicle takes on the bearing of the upper steering train, consisting of a single- or multi-part shaft with interfaces toward the steering wheel and toward the intermediate steering shaft. The intermediate steering shaft is coupled onto the steering column and produces the connection to the steering gear. Furthermore, the steering column makes it possible to position the steering wheel in relation to the driver.

DE 10 2005 034 952 B3 discloses, for example, a steering column, the height and the inclination of which are adjustable. A steering spindle is mounted rotatably in a setting part, which is also called sleeve unit, steering-column tube or steering spindle mounting unit. The sleeve unit is held in a holding part and the holding part is mounted in a holding clamp, which can be fastened to a vehicle body. In order to adapt the position of the steering spindle, or of a steering wheel to be fastened thereto, a clamping system is provided which is adjustable between an open position and a closed position with a setting lever. In the open position of the clamping system, the sleeve unit can be displaced in the longitudinal direction thereof with respect to the holding part and at the same time the holding part can be pivoted in the inclination thereof about a pivot axis in relation to the holding clamp. In the closed position of the clamping system, the steering spindle is fixed in relation to the holding clamp mounted on the body. Steering columns and clamping systems of this type are known in various embodiments in the prior art.

Furthermore, the steering column makes a considerable contribution to driving safety. In the event of an accident, the steering column yields in a defined manner when the driver impacts against the airbag.

In the technical configuration of the steering column, there is a conflict of objectives in terms of requirements for installation space, rigidity and weight. Steering columns of the type in question and the components thereof are presently preferably made from steel, sheet metal, and cast aluminum or magnesium.

However, it is desirable to reduce the weight of the steering column and the structural elements thereof while the strength and rigidity properties remain at least the same. This reduction would lead to a favorable effect on fuel consumption and to improving the driving dynamics of motor vehicles and to increasing the range of electric vehicles.

A minimization of the dead weight while keeping rigidity and strength the same can be achieved by the use of specific materials, such as, for example, fiber composite materials.

Fiber-composite materials are composed of reinforced fibers which are embedded in a matrix. The general rule is that the specific rigidity of a fiber-composite material or of a hybrid material from metal and a fiber-composite material is higher than that of metal alone. The superior properties are only achieved by way of the interaction of both components. A multiplicity of manufacturing methods, in which the fibers which have been preimpregnated with a matrix material are processed, exist. One of the established manufacturing methods is the method of fiber winding. In the fiber-winding method the endless fiber strands (rovings) are wound onto a winding core in a continuous process. The fibers here are often soaked and wet-impregnated with a matrix resin during the same operational step, or non-soaked fibers which are soaked after the winding process by way of a resin-injection method are processed. The fiber-winding process is distinguished by high laminate quality and high precision in terms of the fiber-resin content and in terms of fiber orientation, while at the same time having a high degree of automation and being very economical.

A lattice-type component from a fiber-reinforced plastics material, and a method for manufacturing the same are disclosed in EP 1 268 164 B1. Manufacturing of the lattice-type component is performed by the fiber-winding method, depending on the predetermined stress or the stress to be expected. To this end, a number of winding spools around which the preimpregnated fibers are wound are provided on a winding plate. The cavities between the thus created external belt parts and the intermediate structure are, at least in regions, filled with a filler material. The filler material supports those portions of the lattice-type intermediate structure that are compression-loaded and prevents uncontrolled buckling when the calculated load of said portions is exceeded. Lattice-type structures are distinguished by their high level of stability. It is envisaged that these elements are employed as support beams, for example in a vehicle chassis, the filler material inter alia facilitating the absorption of energy in the event of a crash. The shape and the profile of the reinforcement of the support-beam component cannot be individually designed on account of the predetermined lattice-type structure. The reinforcement may indeed be adapted to the load by way of a variable number of fibers, but a specific design embodiment along force lines of a component is not possible.

SUMMARY

It is therefore the object of the present invention to provide by way of fiber technology individually molded components, in particular for a steering-column assembly and the components thereof of a motor vehicle, which have high strength properties and rigidity properties and are of low weight. Furthermore, a design for components of this type, which enables a defined conception of the components, is to be provided.

This object is achieved by a method having the features of claim 1 or 2, and by a steering-column assembly and the components thereof having the features of claim 6. Advantageous refinements of the invention are represented in the dependent claims.

Accordingly, a method for manufacturing a steering-column assembly and the components thereof, in particular for motor vehicles, is provided, the method comprising the following steps:
a) winding fibers along predetermined tracks about at least one winding spool of a winding core;
b) introducing a curable resin into the fibers;
c) curing the resin and forming the fiber-composite component;
d) removing the at least one winding spool preferably toward the inside into the winding core;
e) removing the winding core and releasing the fiber-composite component;
f) installing the steering-column assembly with the fiber composite component being fitted into the steering column.

In one preferred embodiment, moving the wrapped winding core into a mold is performed after step a), and removing the fiber-composite component together with the winding core from the mold is performed after step c). The resin is then introduced into the mold in step b).

In one alternative embodiment, the fibers have already been soaked with a curable resin prior to winding, so that post introduction of the curable resin may also be omitted. Accordingly, a slightly modified sequence which however leads to the same outcome results. In this alternative embodiment the method comprises the following steps:
a) winding fibers along predetermined tracks about at least one winding spool of a winding core, wherein the fibers are soaked with a curable resin;
b) curing the resin and forming the fiber-composite component;
c) removing the at least one winding spool preferably toward the inside into the winding core;
d) removing the winding core and releasing the fiber-composite component;
e) installing the steering-column assembly with the fiber composite component being fitted into the steering column.

In one preferred embodiment, moving the wrapped winding core into a mold is performed after step a), and removing the fiber-composite component together with the winding core from the mold is performed after step c).

Also in the alternative embodiment, a curable resin may be additionally introduced into the mold before the method step of curing the resin is performed.

The application of the method is particularly preferred for a steering-column assembly in which the steering-column tube, which can in general also be called steering spindle bearing unit or sleeve unit, is guided displaceably along the longitudinal axis of the steering spindle in a pivot lever, and wherein the pivot lever is mounted pivotably about a pivot axis in the console. A height- and length-adjustable steering column of lightweight construction is thereby produced.

Fiber strands are formed on account of the fibers having being wound.

Preferably, in a method step prior to winding, in order to be connected by way of the subsequent method steps to the fibers so as to form an integral component with the fiber-composite component, one or a plurality of functional elements are positioned at predetermined points on the winding core or on the winding spools. The functional elements remain in the component, configuring interfaces and functional faces which cannot be wound in an efficient manner.

Preferably, it may moreover be provided that in a method step prior to winding, an auxiliary material, which keeps the fibers in shape and position until the latter are fixed by curing of the resin, is applied onto the winding core. This auxiliary may be a woven fabric or a cross-laid structure which likewise forms a fiber composite with the matrix and serves for receiving basic loads, for inducing loads, or as a force-free structure.

Furthermore, a steering-column assembly for a motor vehicle is provided, with a steering spindle which is mounted rotatably about a longitudinal axis in a sleeve unit, wherein the steering-column tube is mounted in a console which is designed to connect the sleeve unit to a body of the motor vehicle that has at least one component made from fiber-reinforced composite material which is manufactured according to one of the above-described methods.

A steering-column assembly is particularly preferred here in which the steering-column tube, which can in general also be called steering spindle bearing unit or sleeve unit, is guided displaceably along the longitudinal axis of the steering spindle in a pivot lever, and the pivot lever is mounted pivotably about a pivot axis in the console, wherein the console and/or the pivot lever and/or the steering-column tube is formed from fiber-reinforced composite material in accordance with the method according to the invention. A height- and length-adjustable steering column of lightweight construction is thereby produced.

The component preferably lies in the force flux of the steering column between the steering spindle and the body, as is provided in particular for the console, the pivot lever and the steering-column tube, and along the force flux has fiber-reinforced plastic in which the fibers are wound.

According to one preferred embodiment, the fiber-reinforced plastics material is a combination of various types of fiber structures having identically oriented fibers.

The component preferably has fiber strands, the fibers of which are oriented in a substantially straight line and so as to be substantially mutually parallel along a main direction of flux of force between a selection of in each case two functional elements by way of which the steering column component is supported, wherein spatial regions in which no fibers and also no plastics material are disposed are configured between fiber strands which are thus configured. In other words, the fibers, gathered as fiber strands, are oriented so as to be mutually parallel as in a lattice support-beam structure. The proviso "substantially" relates to permissible deviations from linearity and parallelism in the range of a few angular degrees, certainly less than 5 or preferably less than 3 angular degrees.

In order for components of a steering column, in particular the console, of the pivot lever, or of the steering-spindle bearing unit to be produced, it is particularly preferable for three-dimensional fiber strands to be configured, wherein at least one of the fiber strands is disposed at an angle to that plane that is projected by at least two other fiber strands. Accordingly, at least one functional element is preferably disposed in another plane in relation to that plane that is projected by the at least two fiber strands.

Furthermore, individual fiber strands may be configured so as to be curved in a constantly differentiable manner, wherein the individual fibers within the fiber strand are oriented so as to be substantially mutually parallel. This is of advantage in particular when the flux of force has to be directed across various planes, in particular has to be directed around a fold or edge, and there is no functional element which is disposed in the flux of force provided on the component. On account of the constantly differentiable routing of lines, further transmission of force is performed at a reduced risk of buckling or notching.

Preferably, the component is made using a winding core which prior to fitting of the component in the steering-column assembly is separate from the component and is not contained in the steering-column assembly. This winding core has a contour which mirrors the profile of the fiber strands. On account thereof, in particular the configuration of constantly differentiable and curved fiber strands is readily enabled. The steering column according to the invention has very high rigidity and robustness, despite there being only a few fiber strands having large intermediate spaces which serve in forming the component of the steering column. This becomes possible since the loads are absorbed either along the fiber strands or transversely to the fiber strands by way of adjoining components of the steering column. Accordingly, the component itself does not have to absorb the loads in all directions or itself to be resistant to the loads, respectively.

The envisaged functional elements of the component are preferably selected from the group including fastening elements, guides, motion limiters, bearings, and consoles for wiring looms.

In one further embodiment, the functional elements are sheet-metal lugs having openings, bores, or clearances. Sintered compacts or castings may also be integrated as functional elements of the components. Furthermore, other compacts from various metals or a plastics material may also be employed as functional elements. As those having ordinary skill in the art will recognize, functional elements may also be referred to herein as "operative elements." Moreover, the method according to the invention is particularly flexible here.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Figure 1:
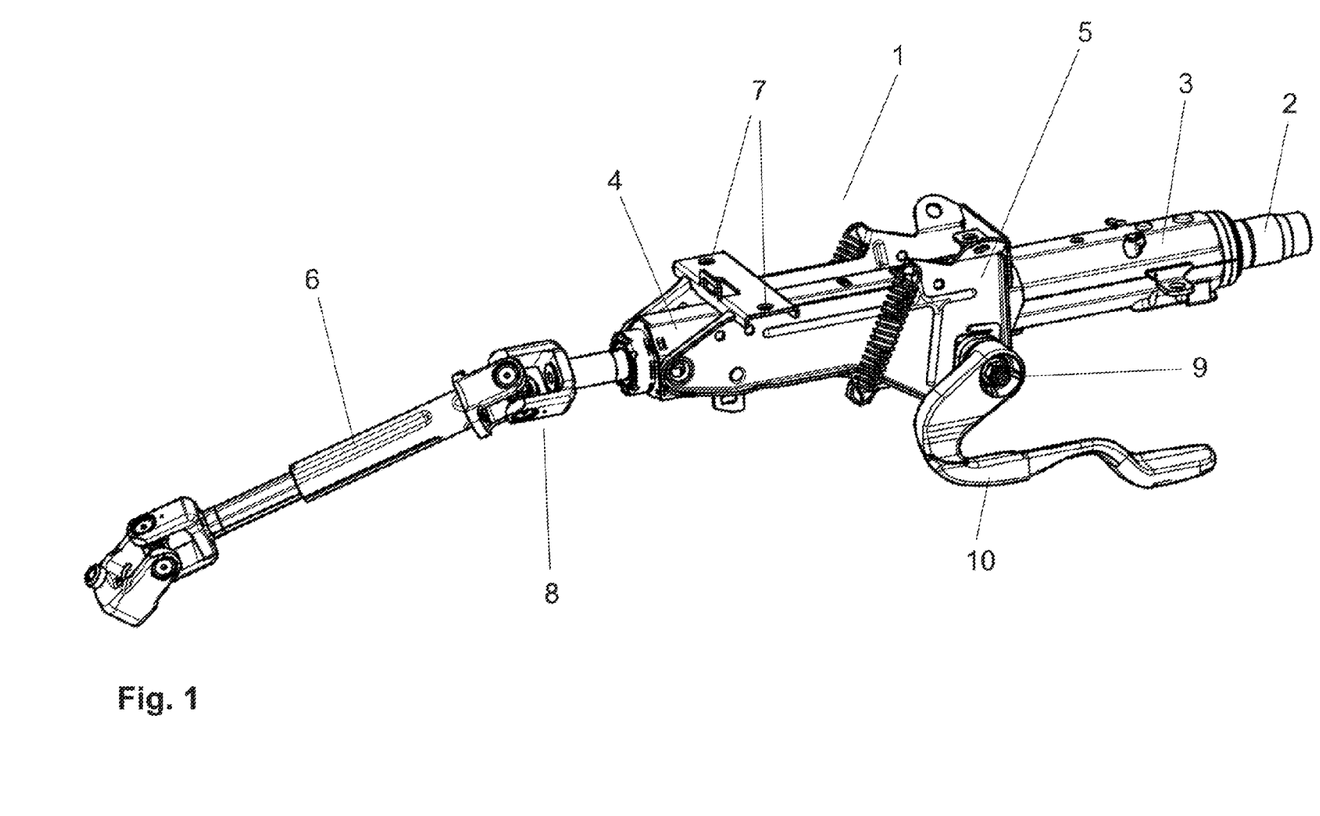
FIG. 1 is a perspective view of an example steering-column assembly.

A steering column 1 of the type in question, having a steering spindle 2, a steering-column tube 3, a pivot lever 4, a console 5, and a control-rod part 6, is illustrated in FIG. 1. The steering spindle 2 is rotatably mounted in the steering-column tube 3. The steering-column tube 3 is guided in the pivot lever 4 so as to be displaceable along the longitudinal axis of the steering spindle 2. The pivot lever 4 is mounted in the console 5 so as to be pivotable about a pivot axis. The console 5 here may be fastened to fastening points 7 on the body (not illustrated). The rotation movement which is introduced by a driver via a steering wheel into the steering spindle 2 is introduced into the steering gear (not illustrated) via a cardan joint 8 and further control-rod parts 6. For enhanced driver comfort, the steering column 1 may be adjusted in height and length thereof. To this end, a fixing mechanism which comprises a tensioning apparatus is provided. The tensioning apparatus has a tension bolt 9, a tension lever 10, and a cam mechanism (not shown). The two cams of the cam mechanism are rotated counter to one another and the lateral walls of the console 5 are contracted by rotating the tension lever 10, on account of which a frictionally engaged tension fit between the side walls of the console 5 and the lateral faces of the pivot lever 4 and in turn with the lateral faces of the steering-column tube 3 is performed. Steering columns of this type are known from the prior art so that a precise illustration is dispensed with here. As an alternative to the example, mounting of the steering spindle 2 may also be performed in a steering-spindle bearing unit which is not configured so as to be tube-shaped and which may also be referred to as a sleeve unit. Likewise, fixing of the steering-spindle bearing unit or of the steering-column tube 3 in relation to the console may be illustrated to be, by means of a form-fit, for example a gear tooth system. Steering columns of this type, for example, are also included in the invention.

Figure 2:
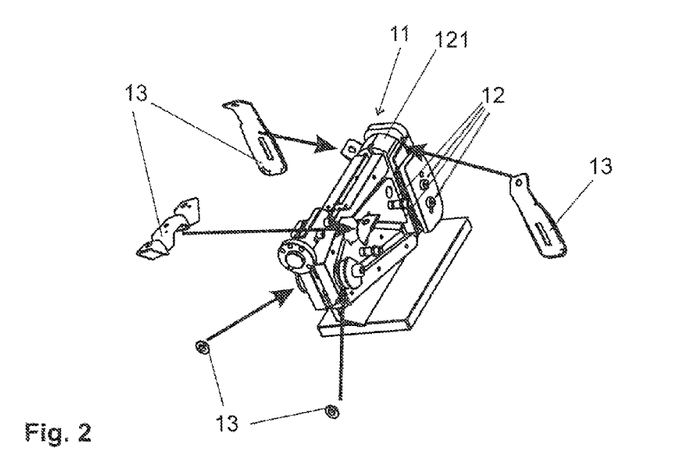
FIG. 2 is a perspective view of an example winding core having winding spools.

FIG. 2 shows a winding core 11 of a console 55 according to the invention, having a multiplicity of winding spools 12, 121, and functional elements 13. The functional elements 13 are positioned on the winding core 11 prior to winding process and during the winding operation are wrapped collectively with the winding core 11 along the winding spools 12, 121. In the context of the invention, the winding spools may not only be formed by simple cylindrical spools 12. Every mold 121 around which the rovings are wound is subsumed by the term "winding spool". After the winding process has been terminated, the winding core 11 is removed, whereas the functional elements 13 remain in the component, configuring interfaces and functional faces which cannot be wound in an efficient manner. Such functional elements include, for example, fastening elements or bearings.

Figure 3:
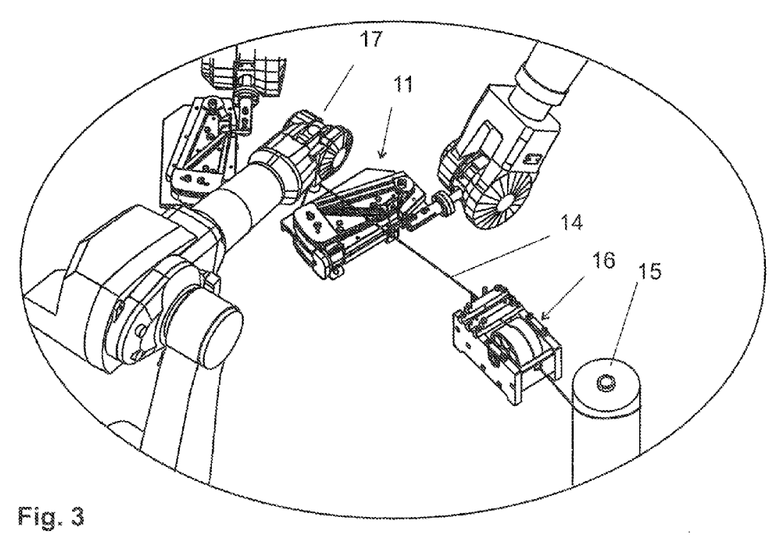
FIG. 3 is a schematic illustration of an example winding operation.

FIG. 3 schematically shows the method according to the invention which is preferably employed for manufacturing the components of a steering column from a fiber-reinforced plastics material. The representation of the console 55 is visualized in the example. However, the steering-column tube, or another steering-spindle bearing unit, or the slide, if existent, or any other load-transmitting component may also be configured by way of this technology. A fiber 14, which is held so as to be pretensioned, is drawn off from a supply package 15 and guided through an impregnation unit 16. The impregnation unit 16 may be configured as a dipping-tank device or, as is illustrated in an exemplary manner, as a roller impregnation device. The impregnated fiber 14, for forming the fiber strands 141, 142, is deposited by means of a guide unit 17, which is connected to a computer-controlled winding machine, on a winding core 11 of a console, which is moved in a synchronized manner with the guide unit 17. It can be seen in the example that the winding operation is performed in a three-dimensional manner, that is to say that the fibers are wound not only in one plane but that a three-dimensional fiber-strand structure is created. This winding operation is preferably performed without interruption, such that all fiber strands 141, 142 are formed by a single and continuous fiber 14.

Figure 4:
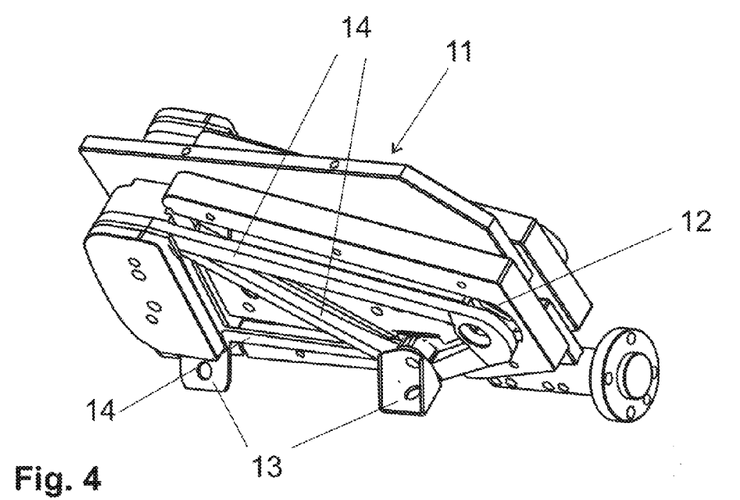
FIG. 4 is a perspective view of an example winding core after a winding operation has been performed.

The winding core 11, having the functional elements 13, is illustrated in the wrapped state in FIG. 4. The impregnated fiber which has been drawn off from the supply package as a roving is deposited according to a predetermined winding plan onto the winding spools 12, 121, and around the functional elements 13. The winding plan is to be determined so as to correspond to the geometry of the component. In the conception of the winding plan, the directions of the flux of force in the console are analyzed, and the strength properties and rigidity properties of the material are exploited in an optimal manner by depositing fibers 14 in a targeted manner in the direction of the flux of force in order for the fiber strands 141, 142, 143 to be formed. This is implemented by adapting the fiber-volume content, the fiber orientation, and the number of fibers so as to correspond to the flux of force. Moreover, the weight of the console is reduced on account of the targeted deposition of the fibers. At least one winding is carried out for producing the console. If a plurality of windings are carried out, the fibers may thus intersect from alternating directions at the intersection points, on account of which the strength in the transverse direction to winding is reinforced. Winding is carried out in a spatial manner. To this end, the winding core is rotated in a computer-controlled manner or is mounted on a rotation axis, such that the fibers can be guided about the core. It can be seen in the example (see also FIGS. 8, 9) how the winding spool 121 does not lie in that plane that is formed by the fiber strands 141 or the fiber strands 143. Correspondingly, during winding a fiber strand 142 which protrudes from the plane which is formed by the fiber strands 141 or the fiber strands 143 is formed.

It has to be considered in the winding plan that the fibers are guided in a straight line for as long as possible before the winding direction and thus the orientation of the fibers are changed. On account thereof, points or buckles of the fibers, which may cause breakage, are minimized. Under the same aspect tensioning of the fibers, as is shown in FIG. 5, may be provided in a further production step after winding.

Figure 5:
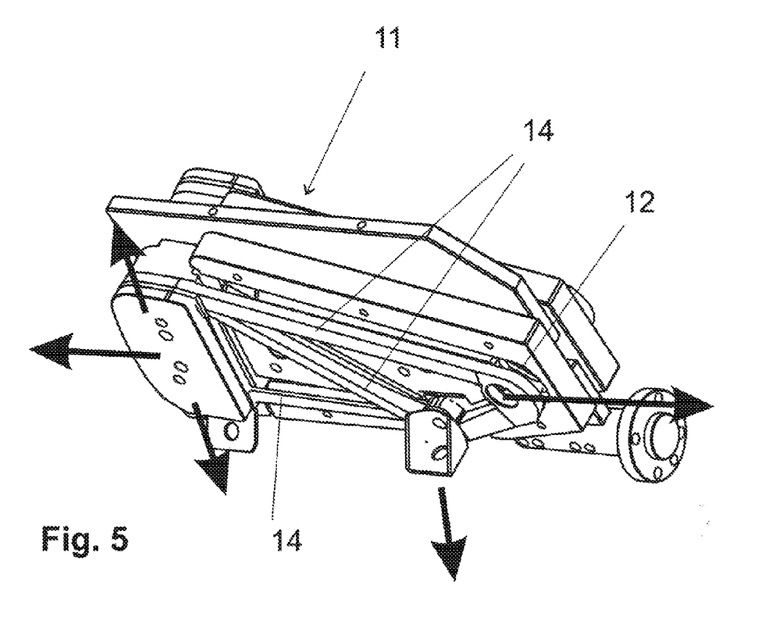
FIG. 5 is a perspective view of the example winding core of FIG. 4, with multiple tensioning directions indicated by way of arrows.

The arrows in FIG. 5 indicate the tensioning directions of the winding core 11. Tension may be generated in a mechanical manner, for example, by displacement of the winding spools 12, or by way of elastic winding spools which yield during depositing and thereafter restore themselves. The fibers are pretensioned by the tension applied on the fibers, such that buckles in the fibers are reduced. This process increases strength and rigidity of the fiber-composite material in the direction of deposition.

Figure 6:
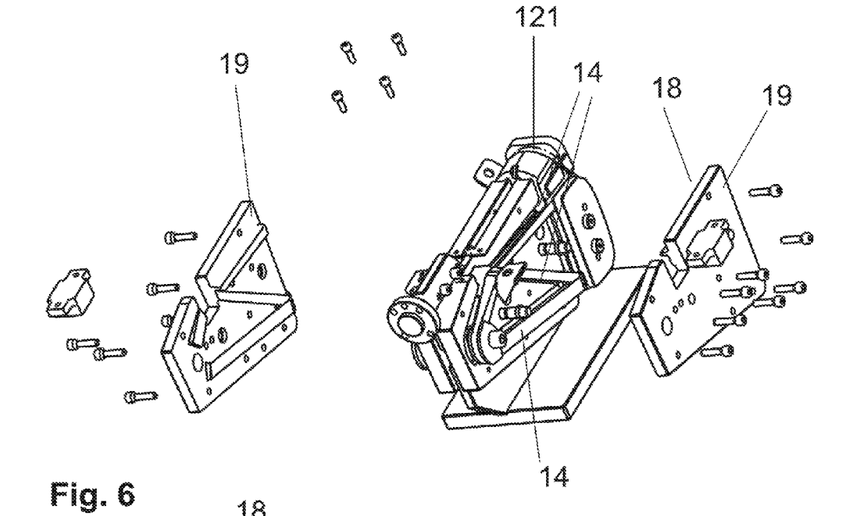
FIG. 6 is an exploded perspective view of an example winding core with an example mold.
Figure 7:
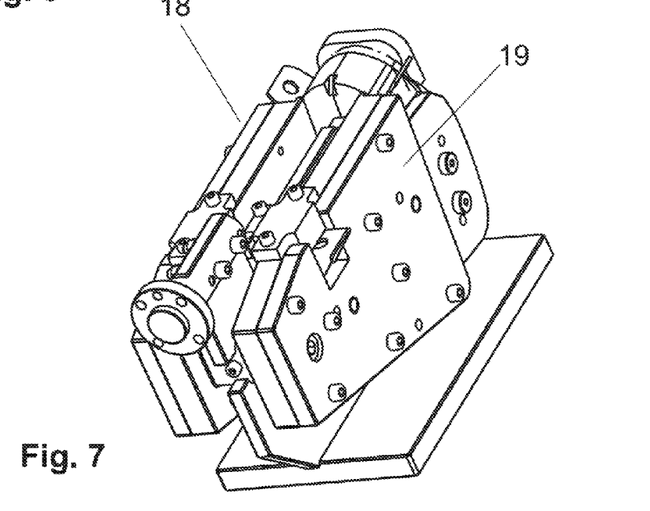
FIG. 7 is a perspective view of an example closed mold.

The matrix of the fibers is cured after winding. In order for it to be shaped, the wrapped winding core 11 in the example is surrounded by a mold 18, as is illustrated in FIG. 6 and FIG. 7. The mold 18 illustrated here has two plates 19 which by means of screw or plug connections are in each case attached to one side of the winding core 11, so as to superimpose the wound part. The mold 18 here compresses the preimpregnated fibers between the plates 19 and the winding core 11, so as to acquire the desired shape. The cross section of the workpiece and the fiber-volume content can be influenced in this way. Curing of the workpiece in the mold 18 is thereafter performed by way of a heated mold, for example, or by placing the mold 18 in a continuous oven.

The mold and the winding core together with the winding spools are removed after curing. To this end, in the example, the winding core is configured such that the winding spools can be removed inwardly into the winding core and that the winding core is thereafter released for removal from the cured console.

Figures 8, 9:
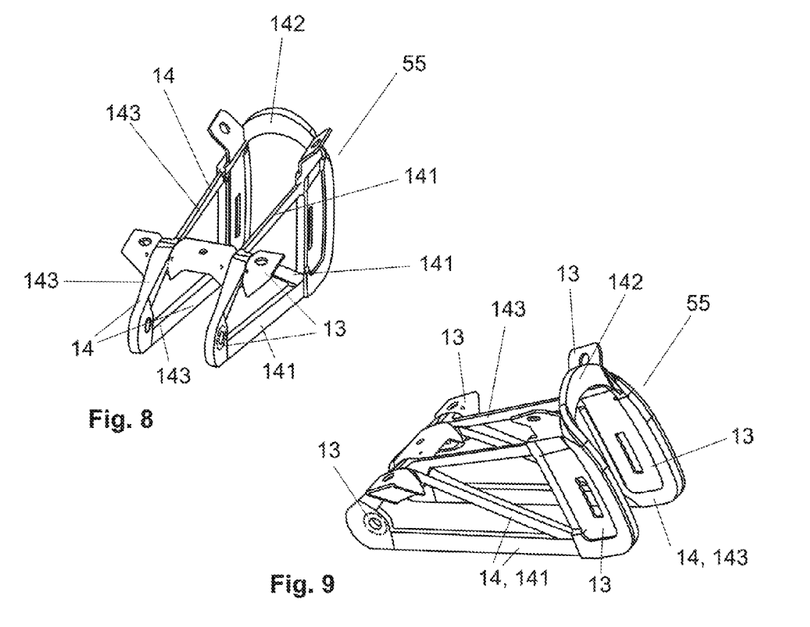
FIG. 8 is a first perspective view of an example console.
FIG. 9 is a second perspective view of the example console of FIG. 8.

The cured console 55 according to the invention is shown in FIG. 8 and FIG. 9. Apart from the structure from a fiber-composite material, which is formed by the fiber strands 141, 142, 143, the individual wrapped functional elements 13 can be seen. It can be seen in the example how the component includes two parallel planes through the fiber strands 141 and 143, which are oriented so as to be mutually parallel, as well as a fiber strand 142 which interconnects the two planes.

Figure 10:
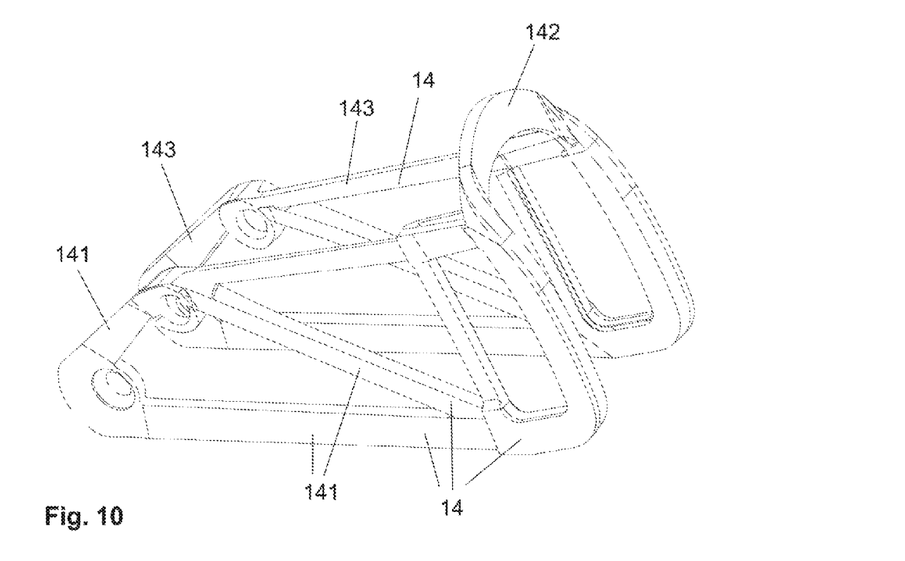
FIG. 10 is a perspective view of an example console.

By contrast, FIG. 10 shows the cured fiber strands 141, 142, and 143 of the console from the preceding figures, without the functional elements.

Figure 11:
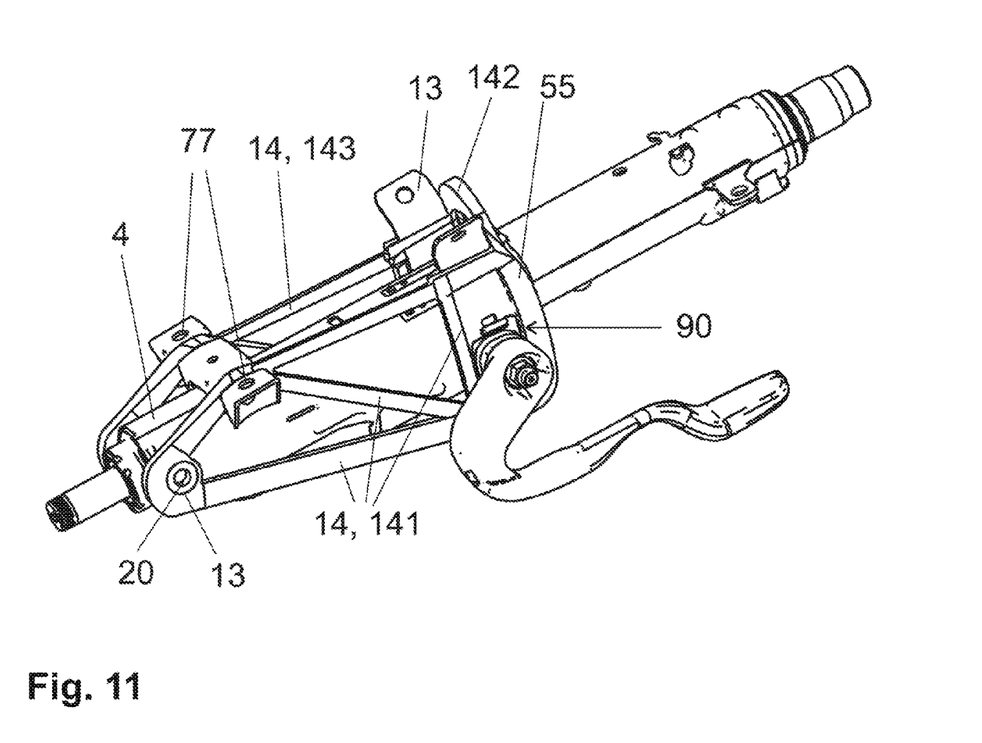
FIG. 11 is a perspective view of an example steering-column assembly.

The steering-column assembly according to the invention having the fiber-composite material console 55 is shown in FIG. 11. The integrated functional elements 13 serve as bearings 20 for the pivot axis of the pivot lever 4, and as fastening elements 77 for fastening the console 55 to the body (not shown here), and for the guide elements of the fixing system 90.

As opposed to steering columns of the generic type as illustrated in FIG. 1, the steering-column assembly according to the invention from FIG. 11, on account of the employment of fiber-composite materials, has a low weight, wherein adequate strength and rigidity are achieved, or even increased strength and rigidity are achieved.

The savings in weight lead to a favorable influence on fuel consumption and to an increase in the range of electric cars. On account of the design which is appropriate for the flux of force, and of the high strength in the fiber direction, the installation space can be kept small. Furthermore, the natural frequency of the steering-column assembly is positively influenced on account of the increased rigidity of the console, such that vibrations of the steering wheel, which are transmitted by the steering column, are significantly minimized, so as to improve the comfort features when driving.

In one other exemplary embodiment (not illustrated here), the pivot lever is manufactured from a fiber-composite material, according to the method described above. All components of the steering-column assembly may be wholly or partially manufactured from a fiber-composite material.

The material properties may be varied in a wide range by the choice of fibers. Carbon fibers, aramid fibers, and/or glass fibers are preferably used individually or in combination.

As has been described earlier, preimpregnated fibers are preferably used. Preimpregnated fibers have a thermoplastic or duroplastic impregnation. The fibers which have been provided with a thermoplastic impregnation in a combination with carbon fibers and/or glass fibers, for example, may advantageously be processed to form a hybrid yarn. In one exemplary embodiment it is provided here that the hybrid yarns during the winding process are heated, such that the thermoplastic fibers are fused and form a matrix of the composite already during winding. The shape of the workpiece may be adapted thereafter by compression in a mold. Fusing of the thermoplastic fibers after the winding process in an oven, or in a heated mold, and/or by the thermoplastic injection-molding method is also possible.

One other exemplary embodiment provides fibers which are not preimpregnated. These fibers are wound as has been described in the earlier exemplary embodiments. After the winding process the mold is assembled, or the workpiece together with the winding core is placed in a mold, and the mold is injected with thermoplastic or duroplastic resin, and the workpiece is cured. All forms of the resin transfer molding (RTM) method are provided for the use of a duroplastic matrix. As opposed to compressing, the matrix compound here is injected by means of a piston from an antechamber, which most often is heated, via distributor ducts into the mold, wherein said matrix compound is cured by heat and pressure.

In order to remove the cured console from the mold, the plates of the mold are also pulled apart here and the winding spools are pulled toward the inside into the mold.

In one further embodiment it is provided that the mold, prior to or after adding resin, is placed into an injection-molding machine, and that the workpiece for further shaping is injection-molded or back-injection molded, using thermoplastic or duroplastic injection molding.

Another exemplary embodiment discloses that the winding, which is appropriate for the flux of force, of fibers is carried out on auxiliary materials, such as, for example, plastic-material fabrics or cross-laid structures, or woven fabrics made from reinforcement fibers, which keep the fibers in shape and position until the latter are fixed by way of a matrix. These fibers, when woven fabrics or cross-laid structures are used, likewise form a fiber composite with the matrix, which serves for absorbing basic loads, for inducing loads, or as a load-free structure.

The steering-column assembly according to the invention has components individually molded by way of fiber technology, having high strength properties and high rigidity properties, and a low weight. The method according to the invention furthermore enables a defined conception of such components, which is appropriate for the flux of force.

What is claimed is:

1. A method of manufacturing a steering-column assembly having a steering spindle rotatably mounted in a steering-column tube, wherein the steering-column tube is mounted in a console that connects the steering-column tube directly or indirectly to a body of a motor vehicle, wherein at least one component of the steering-column assembly is a fiber composite component, the method comprising:
   winding fibers along predetermined tracks about at least one winding spool of a winding core;
   introducing a curable resin into the fibers or a mold;
   curing the curable resin to form the fiber composite component of the steering-column assembly;
   removing the at least one winding spool;
   removing the winding core and releasing the fiber composite component; and
   installing the steering-column assembly with the fiber composite component being fitted into the steering-column assembly.

2. The steering-column assembly according to the method of claim 1.

3. A method of manufacturing a steering-column assembly having a steering spindle rotatably mounted in a steering-column tube, wherein the steering-column tube is mounted in a console that connects the steering-column tube directly or indirectly to a body of a motor vehicle, wherein at least one component of the steering-column assembly is a fiber composite component, the method comprising:
   winding fibers along predetermined tracks about at least one winding spool of a winding core, wherein the fibers are soaked with a curable resin;
   curing the curable resin to form the fiber composite component of the steering-column assembly;
   removing the at least one winding spool;
   removing the winding core and releasing the fiber composite component; and
   installing the steering-column assembly with the fiber composite component being fitted into the steering-column assembly.

4. The method of claim 3 further comprising:
   positioning one or more operative elements at predetermined points on the winding core prior to winding the fibers along the predetermined tracks; and
   connecting the one or more operative elements to the fibers such that the one or more operative elements and the fiber composite component form an integral component.

5. The method of claim 3 further comprising applying an auxiliary material onto the winding core prior to winding the fibers along the predetermined tracks, wherein the auxiliary material is configured to maintain a shape and a position of the fibers until the fibers are fixed by curing the curable resin.

6. The method of claim 3 further comprising removing the at least one winding spool towards an inside of the winding core.

7. The steering-column assembly according to the method of claim 3.

8. The steering-column assembly of claim 7 wherein the fiber composite component is positioned in a force flux of the steering-column assembly between the steering spindle and the body of the motor vehicle, wherein the fiber composite component is formed along the force flux from fiber-reinforced plastic in which the fibers are wound.

9. The steering-column assembly of claim 8 wherein the fiber-reinforced plastic is comprised of a plurality of types of fiber structures having identically oriented fibers.

10. The steering-column assembly of claim 9 wherein the fiber composite component is made using the winding core, wherein the winding core is separated from the fiber composite component prior to fitting the fiber composite component in the steering-column assembly, wherein the winding core is not included in the steering-column assembly.

11. The steering-column assembly of claim 10 wherein the fiber composite component comprises a plurality of operative elements that are fixedly connected to the fiber-reinforced plastic by way of the winding of the fiber and the curing of the curable resin.

12. The steering-column assembly of claim 11 wherein the operative elements are selected from a group including fastening elements, guides, motion limiters, bearings, and consoles for wiring looms.

* * * * *